Jan. 7, 1958     C. S. SMITH     2,819,433
SELENIUM RECTIFIERS AND THE METHOD OF MAKING THE SAME

Filed March 22, 1951     2 Sheets-Sheet 1

INVENTOR.
CLEVELAND SCUDDER SMITH
BY
His Attorney.

United States Patent Office 2,819,433
Patented Jan. 7, 1958

2,819,433

SELENIUM RECTIFIERS AND THE METHOD OF MAKING THE SAME

Cleveland Scudder Smith, Indiana, Pa., assignor to Syntron Company, Homer City, Pa., a corporation of Delaware Application March 22, 1951, Serial No. 217,031

18 Claims. (Cl. 317—234)

This invention relates generally to improved blocking layer devices and methods for producing blocking layer devices, and more particularly to the method of producing dry plate rectifiers of the selenium type.

The principal object of this invention is the provision of a method for depositing and for controlling the uniformity of a series of selenium layers to produce a selenium cell, the uniformity being both in layer thickness and in layer composition. This uniformity is directional and may be controlled or maintained longitudinally and laterally of the cell.

Another object is the provision of a method for controlling the thickness of the selenium layers in a blocking device to make them suitable for a predetermined voltage rating. A thicker selenium layer is required for higher voltages and the method comprising this invention permits evaporation of selenium to produce layers of any desired thickness to build a suitable deposit for predetermined voltages.

This process insures a comparatively flawless selenium deposit of the proper type of crystalline structure for high quality rectification. Each layer of the series of selenium layers is deposited as black amorphous selenium, which is caused to crystallize to the correct crystalline form before the next layer is deposited thereon. Any particles on any layer are quickly covered, which produces a very good and uniform composition.

Another object of this invention, is the method of controlling the halogen concentration in each selenium deposit on the conducting base. A relatively high percentage of halogen concentration is in the first layers deposited on the base. The final layers either have relatively low or no halogen concentration. When there is no halogen in the final layers of selenium the deposits are heated to control the migration of halogens from the first layers to the final layers. It is important to accurately control the halogen concentration in the final layers to lower the resistivity but not enough to inhibit the ability to develop and form a blocking layer. This control provides a favorable resistivity gradient in the layers.

Another object is the method of producing large area blocking layer devices at low cost mass production.

Another object is the method of reducing the cost of production of blocking layer devices by applying the vaporized deposits through a very short and uniform distance which requires less expensive vacuum pump equipment to operate.

Another object is the provision of the method of manufacturing blocking layer devices. This method not only includes the sequence of steps of producing the blocking layer devices but also the timing of the steps together with the rate and thickness of the deposits. This method embraces a continuous process for the production of the blocking layer devices.

Another object is the provision of the method of coating opposite surfaces of one conductor base plate or the outer surfaces of two conductor base plates simultaneously when assembled back to back.

Other objects and advantages appear in the following description and claims.

The invention may best be understood by reference to the following description taken in conjunction with the drawing in which.

Figure 1:
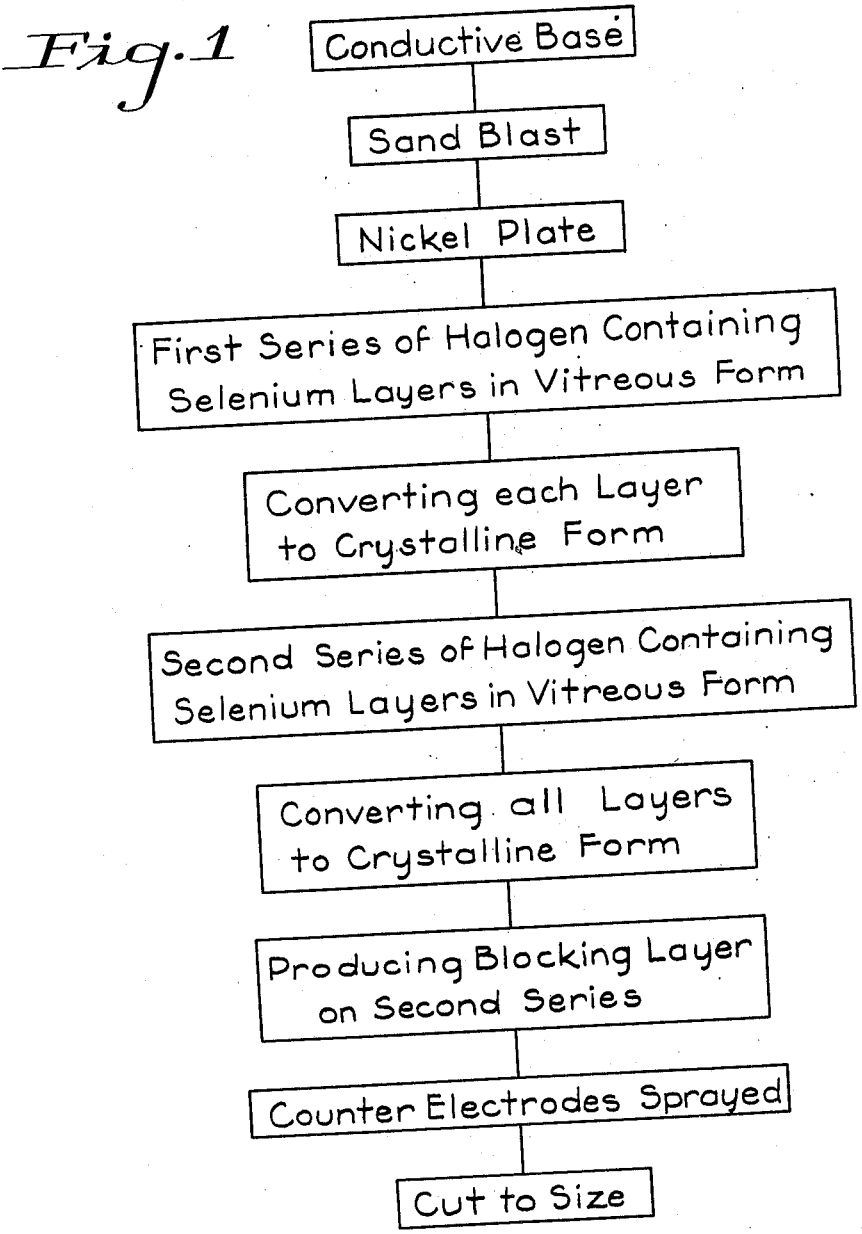
Fig. 1 is a flow sheet diagram showing the procedural steps employed in this invention.
Figure 2:
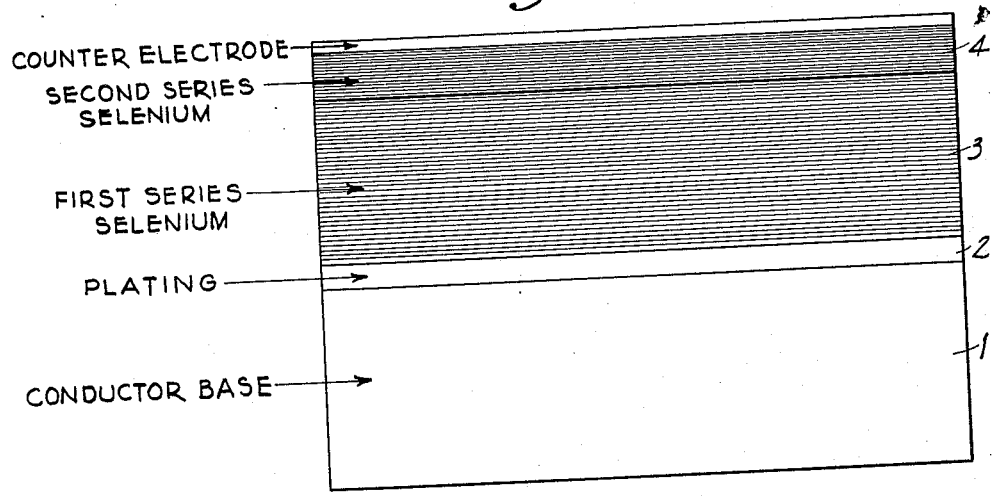
Fig. 2 is a sectional view of a blocking layer rectifier produced in accordance with this invention.
Figure 3:
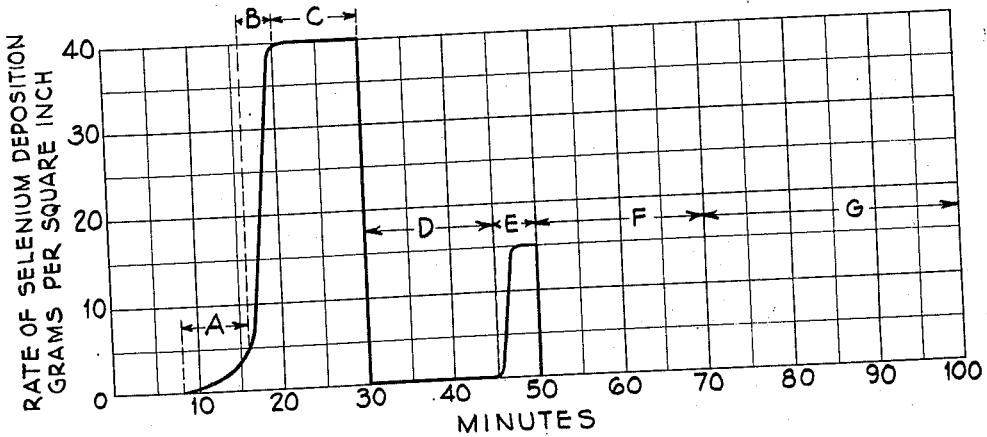
Fig. 3 is a graph illustrating the rate of selenium deposited.

In the process comprising this invention a series of selenium layers may be added consecutively as separate deposits or they may be deposited in two independent and separate steps. A master selenium mix is employed for each deposit. These master selenium mixes may each contain a high proportion of one of the halogens; iodine, bromine, chlorine or fluorine, or the second deposit may be free of a halogen. A halogen containing master mix is added to selenium in predetermined proportions for producing deposited layers in the first phase or the first step and the other halogen containing master mix is added in predetermined proportions to another batch of selenium or the halogen-free selenium batch is used for producing the second series of layers. There is a greater halogen concentration in the batch for the first deposit of the layers than in the batch for the second deposit of the layers.

The layers of each deposit are evaporated on a conducting base in a relatively short period of time and with very short intervals between the deposit of each layer and the time period between the first and second deposits of the two series of layers may be greater than the time interval between the deposit of consecutive layers, which is a matter of a fraction of a minute. The conducting base or sheet may be mounted in arc shape for rotation about a central axis in a vacuum with the surface of the conducting base less than one inch from the evaporator which is mounted in a fixed position to deposit a great many thin finite layers of selenium in vitreous form in a first series as the arc-shaped sheet rotates. Each of the deposited finite layers of selenium is heated to convert it to crystalline form before the next finite selenium layer is deposited. The temperature is regulated and the deposits are made in a vacuum with relative movement between the conducting base and the vaporizer. This relative movement permits a series of finite layers to be deposited at intermittent intervals enabling one to control the ultimate thickness of the deposited layers and their uniformity. These are very important advantages of this process. A great many finite layers of selenium in vitreous form may be deposited as the first series of layers on the conducting base as the latter continues to rotate to build up a second series of finite layers which are converted to crystalline form.

The blocking layer device of this invention comprises the metal conductive base 1 which functions as the carrier electrode and is preferably an aluminum alloy known as Duralumin. A large sheet of this aluminum is first sandblasted to provide a uniform roughened surface. A grit size of approximately 220 mesh silicon carbide is employed to produce peaks and valleys, the dimensions of which are small compared to the three to four thousandths inch selenium thickness. This sandblast time is determined experimentally and reduces the forward rectifier resistance to a minimum.

The blasted aluminum sheet is then placed in a suitable bath and light nickel-plated indicated by the layer 2. This light nickel coating improves the electrical contact between the selenium and the aluminum.

The sheet, when in a vacuum, is then passed over a temperature controlled vaporizing pot which contains the selenium to be deposited on the sheet. The conducting base is mounted arc shape for rotation about a central axis and the selenium is applied in vitreous form from a fixed position to the surface of the conducting base as it rotates to deposit a series of selenium layers thereon. This selenium is then converted to crystalline form and the second series of selenium layers is deposited in vitreous form on the first series of selenium layers as the conducting base is rotated. The vitreous selenium of the second series of layers is then converted to crystalline form and a blocking layer and counter electrode is added. The selenium applied in vitreous form may be by vaporizing. Fifty or more layers may be added as shown in the drawings. The selenium is preferably made in two master mixes, each containing a high proportion of one of the halogens; iodine, bromine, chlorine or fluorine. One master mix is used for the first series of layers 3 and the other for the second series of layers 4. A sufficient quantity of each of the master selenium mixes is added to predetermined amounts of selenium to produce a batch of selenium for each evaporator. The amount of selenium in each batch together with the rate of evaporation and the speed that the plate is passed over the evaporators determines the thickness of each selenium layer evaporated on the conducting plate and the total thickness of the two groups of selenium layers. When selenium is supplied in batches the batch is measured accurately and evaporization continues until the whole of the batch is used by repeatedly passing the base over the evaporator until it is all gone.

The first series of layers is made from a batch of selenium having approximately one halogen atom to approximately 2,000 selenium atoms. The second batch is about 15% by weight of the first batch and it contains approximately one halogen atom to 20,000 selenium atoms. Thus the first series of layers produce a much heavier deposit than the second series of layers and the latter have a materially less halogen atom concentration which is insufficient to inhibit the ability to develop the blocking layer but sufficient to be effective in lowering the resistivity of this second series of layers.

A halogen-free selenium may be evaporated on the base to provide the second series of layers in which case the base is heated to approximately 212° C. and for a sufficient length of time to change the vitreous selenium to crystalline form and cause migration of halogen atoms from the first to the second series of layers to be effective in lowering its resistivity. Care must be taken in this heat treatment step to prevent migration of excessive halogen atoms that would inhibit the formation of the blocking layer. Thus in either mode the second series of layers contain halogen atoms.

The conducting base sheet is repeatedly passed over the selenium evaporators and each time an additional layer of selenium is evaporated onto the sheet. The temperatures are controlled to insure evaporation of the selenium in black amorphous or vitreous form. Before the sheet is again passed over the evaporator the previously deposited layer is converted into crystalline form. This is performed by heat treating each vitreous layer right after it is formed. The conversion of each of the series of layers in turn from black vitreous to crystalline form before the next layer is deposited thereon provides a very uniform selenium composition, and any specks or other foreign matter that may happen to occur on the surface is immediately covered by the crystalline surface leaving no holes or weak spots in the formation of these surfaces.

The total thickness of the selenium layers must be sufficient to prevent a breakdown by the voltage rating of the cells being produced. The thickness of the selenium determines the ability of the cell to prevent arcing between the counter electrode and the base. Roughly .15 mill of selenium is needed per bolt of R. M. S. inverse volts. An 18 R. M. S. cell requires a selenium deposit 2.7 mills thick, a 26 volt cell requires 3.9 mills of selenium and a 40 volt cell requires 6 mills of selenium.

The selenium batches containing the master mixes are poured into the evaporators in molten form and are quickly cooled to maintain the black vitreous form. Heat is then initially applied to the plate in vacuum, and relative movement is made between the plate and the evaporator with a very short distance, less than one inch, between them. Sufficient heat is applied to the evaporator to vaporize the selenium. As the surface of the plate is subjected to repeated deposits by the evaporating selenium, it is heated to convert these black amorphous deposits to crystalline form before the next consecutive layer is added. The initial rate of deposit as indicated by section A of the graph may be relatively low owing to the fact that the temperature of the plate is low. When the plate reaches approximately 120° C. the rate of the deposit is very rapid, as indicated by section B of the curve, until the ultimate rate of evaporation takes place throughout the period C. When the plate is above 120° C. the black vitreous deposit is converted to crystalline form before the next deposit is made thereon. If the plate is moved at a uniform speed across the evaporator the layers are thinner in the period A and part of B and are relatively uniform throughout the period C. At the end of this period all of the first selenium batch has been evaporated in black vitreous form onto the plate and each layer of the selenium was converted into crystalline form between each pass over the evaporator under predetermined temperature and speed conditions. The total time of each of these periods, A, B and C is approximately 23 minutes. At the start of A the temperature of the sheet is hot enough to prevent deposition in a low temperature crystalline form.

The plate is then permitted to cool for a period of 15 minutes as indicated by the period D, after which the second batch of selenium is vaporized. As previously stated this batch is only 15% by weight of the first batch and the plate is not reheated but is passed repeatedly over the second evaporator to deposit the second series of layers on the first series. Being a materially less quantity it takes the second batch only a short time to be completely evaporated as indicated by the period E.

After the selenium deposits have been made the plate may be heated at approximately 212° C. for a sufficient length of time to heat-treat the cell and improve its electrical characteristics. If the second series of deposited layers of selenium are halogen-free then sufficient time must be given to permit the halogens from the first series of layers to diffuse to the second series of layers to be effective in reducing the resistivity thereof. Too long a time must be avoided as too high a halogen concentration will prevent building up a good blocking layer and excessive heat permits excessive halogen diffusion into the second series of layers. Some halogen diffusion permits a minimum forward resistance for a given voltage rating.

If the second series of selenium layers contain a small percentage of halogen atoms, then it is important that this heat treatment for the period F be only for that period of time that will not permit the highly concentrated halogen atoms of the first series of layers to diffuse to the second series of layers.

One mode of avoiding diffusion of the higher concentrated halogens from the first to the second series of layers is to heat-treat the sheet after the deposit of the first series of layers. If the temperature of the plate is raised to 212° C. the halogen will have an opportunity to rise to the surface of the selenium and pass off as a vapor although ample halogen content is retained to lower the resistivity of this group of layers. The second series of layers with the halogen containing the selenium component is then evaporated on the plate as the subsequent heat treatment will not diffuse the halogen atoms from the first to the second layers to a very great extent. This subsequent heat treatment need only be sufficient to insure that all of the black vitreous deposits have been converted to the crystalline state.

It has been found experimentally, that better quality is obtainable when second selenium component deposits are in the black vitreous form and then rapidly brought to heat treating temperature to convert this amorphous form to the crystalline state. The reason for this improvement is believed to be due to the slow rate of diffusion of the halogens through the black vitreous selenium to the second layers. It requires approximately 30 seconds to begin crystallizing and approximately another 30 seconds to approach full crystallization which is a minute's time in which very little halogen could diffuse into the second layer. Full crystallization may be reached in 2 to 5 minutes at which time the halogens diffuse faster, but due to the slow start it does not have time to reach the second series in any appreciable quantities by the time crystallization is complete.

After heat treatment the plate may be exposed to an oxidizing agent to develop a selenium oxide film on the second series of layers to form a barrier layer.

After the formation of the barrier layer by producing an oxide thereon, the plates are suitably masked as to ultimate shape and size and the counter electrodes are sprayed on the oxide film and electroformed in methods familiar to the art. Finally the plates are punched and sheared to the particular sizes required.

The conducting base material is preferably a large sheet, plate or long strip and may have selenium layers vaporized on both sides thereof at the same time in which instance a portion of the base material is bared to obtain or to attach a conductor. Again the conducting base material may be two sheets, plates or long strips placed back to back for the purpose of having the selenium layers vaporized at the same time on each conducting base material. The use of the term conducting base material in the claims is defined to include both sides or one side of each sheet, plate or strip placed back to back for vaporizing selenium thereon at the same time. In either event the selenium layers are of the same consistency and are applied under the same conditions and in the same steps as previously described.

An extremely high quality plate may be produced by suitable adjustments of the first and second series of layers of the selenium component as to thickness and composition. By treating large size plates and afterwards punching and shearing them to size, very high production may be obtained at relatively low cost.

I claim:

1. The method of producing a selenium rectifier on a conducting sheet which comprises the steps of repeatedly passing the conducting sheet over the discharge of a temperature controlled vaporizer in a vacuum to deposit thereon a great number of very thin layers of vitreous selenium to produce on the conducting sheet a coating made up of a series of finite layers, heating the vitreous selenium to convert it into crystalline form, thereafter producing a blocking layer on the surface of the crystalline selenium, and applying a counter electrode on the blocking layer.

2. The method of claim 1 wherein the conducting sheet is first sandblasted and then immersed in a bath to apply a nickel coat thereto.

3. The method of claim 1 wherein the speed of movement of the conducting sheet over the evaporator controls the thickness of each finite layer of selenium and the total number of times it is passed over the evaporator controls the number of layers.

4. The method of claim 3 wherein the conducting sheet is mounted in arc shape for rotation about a central axis to repeatedly pass its surface over the vaporizer.

5. The method of claim 4 wherein the surface of the conducting sheet is less than an inch from the discharge of the vaporizer.

6. The method of claim 1 wherein the conducting sheet is progressively moved over the discharge of the vaporizer while each finite layer of selenium is applied thereto.

7. The method of claim 1 wherein each finite layer is applied in vitreous form and then converted by heating to crystalline form while movement of the conducting base subsists and before the next finite layer is applied thereto.

8. The method of claim 1 which also includes the steps of depositing the finite selenium layers in two series of layers, heating each finite layer of the first series to convert the selenium to crystalline form before the next finite layer is applied thereon, cooling the first series of layers, repeatedly passing the cooled first series of layers over the discharge of a vaporizer in a vacuum to deposit thereon a great number of very thin layers of vitreous selenium to produce the second series of layers, and heating the second series of layers for a sufficient length of time to convert the vitreous selenium to crystalline selenium.

9. The method of claim 8 which also includes the step of heating the first series of deposited layers as a coating before applying the second series thereto.

10. The method of claim 1 which also includes the steps of depositing the finite selenium layers in two series of layers, the first series containing approximately one of halogen for every two thousand selenium atoms and the second containing no halogen.

11. The method of claim 10 which also includes the step of applying heat to the second series of finite layers of selenium for a sufficient period of time to diffuse some of the halogen from the first series of layers to the second series of layers.

12. The method of claim 10 which also includes the steps of converting each finite layer of the first series by heating to crystalline form while movement of the conducting base subsists and before the next layer is applied thereto, heating the first series of deposited layers to insure complete crystallization before the second series of layers are applied, and heating the second series of layers for a sufficient length of time to convert the selenium from vitreous to crystalline form but prevent the halogens from reaching the surface of the second series of layers.

13. The method of claim 1 which also includes the steps of depositing the finite selenium layers in two series of layers, the first series containing approximately one of halogen for every two thousand selenium atoms and the second containing a still smaller percentage of halogen.

14. The method of claim 1 wherein the conducting sheet is large and the counter electrode is applied in its ultimate size and shape and the conducting sheet is thereafter punched and sheared to the size of use of the rectifier cut therefrom.

15. The method of claim 1 characterized in that the shape of said counterelectrode is one of a multiple of ultimate sizes and shapes.

16. The method of producing a selenium rectifier on a conducting sheet which comprises the steps of repeatedly passing each side of the conducting sheet simultaneously over the discharge of temperature controlled vaporizers in a vacuum medium to deposit on each side a great number of very thin layers of vitreous selenium to produce on each side of the conducting sheet a coating made up of a series of finite layers, heating the vitreous selenium to convert it into crystalline form, thereafter producing a blocking layer on the surface of each series of crystalline selenium, and applying a counter electrode on each blocking layer.

17. The method of producing selenium rectifiers on conducting sheets which comprises the steps of mounting the sheets back to back, repeatedly passing the outer side of each conducting sheet simultaneously over the discharge of temperature controlled vaporizers in a vacuum medium to deposit on the outer side of each sheet a great number of very thin layers of vitreous selenium to produce on each sheet a coating made up of a series of finite layers, heating the vitreous selenium to convert it into crystalline form, thereafter producing a blocking layer on the surface of each series of crystalline selenium, and applying a counter electrode on each blocking layer.

18. A selenium rectifier comprising a conducting sheet having approximately fifty or more of very thin superimposed finite layers of selenium in crystalline form, a current blocking layer on the topmost selenium layer, and a counter electrode on said current blocking layer.

References Cited in the file of this patent

UNITED STATES PATENTS

| | | |
|---|---|---|
| 1,784,611 | Polyani et al. | Dec. 9, 1930 |
| 2,189,576 | Brunke | Feb. 6, 1940 |
| 2,367,943 | Hein | Jan. 23, 1945 |
| 2,453,763 | Smith | Nov. 16, 1948 |
| 2,476,042 | Hewlett | July 12, 1949 |
| 2,481,739 | Goodman | Sept. 13, 1949 |
| 2,501,331 | Hein | Mar. 21, 1950 |
| 2,524,270 | Pelfrey | Oct. 3, 1950 |

FOREIGN PATENTS

| | | |
|---|---|---|
| 482,239 | Great Britain | Mar. 25, 1938 |
| 629,869 | Great Britain | Sept. 29, 1949 |
| 632,752 | Great Britain | Dec. 5, 1949 |